(12) United States Patent
Archibald

(10) Patent No.: US 11,320,341 B2
(45) Date of Patent: May 3, 2022

(54) SPINDLE SUPPORT ARRANGEMENT USED IN BIAXIAL TESTING FOR MEASURING FORCES ACTING ON A WHEEL AND TIRE ASSEMBLY

(71) Applicant: INDEPENDENT TEST SERVICES, Canton, MI (US)

(72) Inventor: Kyle R. Archibald, Canton, MI (US)

(73) Assignee: INDEPENDENT TEST SERVICES, Canton, MI (US)

( * ) Notice: Subject to any disclaimer, the term of this patent is extended or adjusted under 35 U.S.C. 154(b) by 329 days.

(21) Appl. No.: 16/599,530

(22) Filed: Oct. 11, 2019

(65) Prior Publication Data
US 2021/0108989 A1 Apr. 15, 2021

(51) Int. Cl.
*G01M 17/02* (2006.01)
*G01L 5/16* (2020.01)

(52) U.S. Cl.
CPC ............. *G01M 17/021* (2013.01); *G01L 5/16* (2013.01); *G01M 17/022* (2013.01)

(58) Field of Classification Search
None
See application file for complete search history.

(56) References Cited

U.S. PATENT DOCUMENTS

| | | | | |
|---|---|---|---|---|
| 5,107,702 A | * | 4/1992 | Iwama | G01M 17/021 73/146 |
| 5,886,350 A | * | 3/1999 | Cook | G01L 5/20 250/225 |
| 6,095,449 A | * | 8/2000 | Gallo | G01L 1/086 242/365.4 |
| 6,324,919 B1 | * | 12/2001 | Larsen | G01L 5/1627 73/862.043 |
| 6,729,178 B2 | * | 5/2004 | Leska, Sr. | G01M 17/04 73/115.07 |
| 7,254,995 B2 | * | 8/2007 | Leska, Sr. | G01M 17/022 73/146 |
| 7,934,421 B2 | * | 5/2011 | Olex | G01M 17/013 73/146 |

* cited by examiner

*Primary Examiner* — Peter J Macchiarolo
*Assistant Examiner* — Jermaine L Jenkins
(74) *Attorney, Agent, or Firm* — Dickinson Wright PLLC

(57) ABSTRACT

An assembly for use in conducting a biaxial test on an object. The assembly comprises a housing that has an interior, and a spindle carriage assembly having a carriage. A portion of the spindle is telescoped with the carriage and coupled to the carriage by a bearing to allow rotation of the spindle. A silhouette is coupled to the spindle for supporting and connecting the spindle to the object during a biaxial test. A transducer is coupled to the carriage and cooperates with the spindle for measuring forces acting on the spindle. The spindle carriage assembly couples to the housing with the carriage disposed in the interior of, and spaced from, the housing, wherein forces that act on the object and the housing are transferred directly to the spindle and measured by the transducer.

20 Claims, 4 Drawing Sheets

SPINDLE SUPPORT ARRANGEMENT USED IN BIAXIAL TESTING FOR MEASURING FORCES ACTING ON A WHEEL AND TIRE ASSEMBLY

CROSS-REFERENCE TO RELATED APPLICATION

This application makes no claim of priority to an earlier application.

TECHNICAL FIELD

The disclosure relates to a spindle carriage assembly for measuring forces and moments that act on an object during a biaxial test. The disclosure provides greater efficiency and accuracy in biaxial fatigue and durability testing of an object, such as a wheel-and-tire assembly.

BACKGROUND

Biaxial test are used to determine fatigue and durability characteristics of an object. More specifically, biaxial test simulate real-world conditions on an object, and sensors measure the objects repose to such conditions to provide fatigue and durability characteristics of the object. As an example, biaxial test are performed on various parts of an automobile to determine the fatigue life of such parts. One commonly tested part is an automobile's wheel-and-tire assembly, and the components thereof, such as the rim, hubs, bearings, bolts, and other fasteners. Of course, biaxial tests are utilized in many other industries, such as the aerospace and marine industries.

In the automotive industry, well-known biaxial wheel test assemblies are used to conduct biaxial tests on wheel-and-tire assemblies, or wheel assemblies, to determine fatigue life and the location of fractures in the wheel assembly under real-world road conditions. One prior art biaxial wheel test assembly is described in U.S. Pat. No. 7,934,421, which issued to Olex et al. on May 3, 2011 ("the '421 Patent"). Other prior art biaxial wheel test assemblies are also described in SAEJ2562, which is incorporated herein by reference. With reference to FIG. 1, which illustrates the exemplary prior art assembly of the '421 Patent, the prior art assembly includes a base and a rotatable drum mounted to the base. The drum has an inner surface and extends along a cylindrical axis to define a cavity. A motor is coupled the base and the rotatable drum, and causes or drives rotation of the drum. A tailstock assembly is coupled to the base for supporting a wheel assembly. More specifically, a spindle of the tailstock assembly receives and supports the wheel assembly. The spindle couples to the tailstock assembly such that the spindle may pivot the wheel assembly about an axis perpendicular to the cylindrical axis, and allow for the free rotation of the wheel assembly about its center. Relative to the drum, actuators of the tailstock assembly facilitate lateral, vertical, and pivotal movement of the spindle, and in turn the wheel assembly.

During a biaxial test, the motor rotates the drum, and the actuators of the tailstock assembly position the wheel assembly in the cavity of the drum to cause contact between the wheel and the inner surface of the drum, which causes forces to act on the wheel assembly. As will be further detailed below, a plurality of transducers are disposed in the wheel assembly and the actuators to measure forces that act on the same during the biaxial test. The transducers are in electrical communication with, and provide force measurement signals to a processor of the test assembly. The processor receives and processes the force measurement signal to output a force reading, typically through a display of a computer. Moreover, the force measurements are used to control the lateral, vertical and pivotal movement of the wheel assembly by the actuators.

With reference to the test assembly of the '421 Patent, a rotating first transducer is positioned between the spindle and the wheel assembly to measure forces (which can include moments) applied to the wheel assembly. The first transducer is in electrical communication with the processor. In these test assemblies, however, the first transducer rotates with the wheel assembly, i.e., the transducer is not stationary. As will be appreciated by those of skill in the art, the rotation of the first transducer presents three issues. First, a slip ring is utilized to facilitate the electrical communication between the first transducer and the processor. As is common with slip rings, the electrical signal can lag, resulting in inaccuracies in the force measurement. Second, without tracking the angular location of the first transducer during rotation, the location of the force measured by the first transducer is unknown. Accordingly, prior art test assemblies also include a plurality of position sensors in electrical communication with the processor. In turn, and at a given point in time, the position sensors communicate with the processor to provide the location, or angular position, of the first transducer, and the first transducer sends a signal representing the force measurement to the processor. The processor then calculates and outputs the location and measurement of the force(s) acting on the wheel assembly. Yet, such force measurement does not accurately reflect the actual force being applied to the wheel assembly, which leads to the third issue of electrical interference. Due to the low voltage communication between the slip ring and the first transducer, minor electrical interferences can cause a disruption in the communication between the slip ring and the first transducer. For example, the electrical interference may be caused by the high voltages that power the motor and actuators, or a low voltage when lights in a room are turned on.

With the first transducer between the spindle and the wheel assembly, forces measured by the first transducer are affected by the forces acting on the wheel assembly through the actuators. More specifically, the first transducer measures the forces caused by the contact of the wheel assembly with the inner surface of the drum, and also forces caused by the actuators. Therefore, additional transducers are associated with the various actuators to measure the forces caused by the actuators. These transducers are typically non-rotating, and are each in electrical communication with the processor. With the force measurements from these transducers and the first transducer, the processor then calculates the actual forces applied to the wheel assembly by summing force measurements from the transducers. As will be understood by those of skill in the art, such processing utilizes complex mathematical formulas, and can result in inaccuracies due to lag, or interference, in the electrical communications between the transducers and the processor, among others. Moreover, these test assemblies require consistent calibration and recalibration to reduce inaccuracies. The result is an increased duration of the biaxial test.

For the above reason, there is a need in the art for an apparatus capable of increasing the efficiency of a biaxial test due to the rotating transducer, slip ring, position sensors, and a transducer associated with each actuator.

SUMMARY

The present disclosure solves the problems discussed above during a biaxial test by providing a spindle carriage assembly that includes a non-rotating transducer for measuring forces, moments, and/or torques of the spinning axis acting on a wheel assembly. The spindle carriage assembly may be retrofitted into the prior art wheel test assemblies to replace the spindle, and couple to the tailstock. As will be appreciate by the discussion below, a single non-rotating transducer of the spindle carriage assembly measures all forces acting on a wheel-and-tire assembly ("wheel assembly"). The result is less error and greater efficiency in the calculation of the forces acting on the wheel assembly which increases the efficiency of a biaxial test.

In an exemplary embodiment of the disclosure, the spindle carriage assembly comprises a carriage with a cylindrical shape, and the carriage is aligned coaxially with an axis A. The carriage has a first cavity and first and second ends, and a lip that extends radial from the first end. A pair of bearings are disposed in the cavity and couple to the carriage adjacent the respective first and second ends. A spindle extends along and is coaxially aligned with axis A, and is rotatably coupled to the carriage by the first and second bearings. The spindle has a head portion, and a shaft portion that extends from the head portion, where the shaft portion is disposed in the cavity of, and telescoped with, the carriage, and the head portion is spaced from the lip of the carriage.

An adapter plate of the spindle carriage assembly is coaxially aligned with axis A, and is coupled to the head portion of the spindle. Additionally, a silhouette is coaxially aligned with the axis A, and couples to the adapter plate. The silhouette is designed to receive and support the wheel assembly during a biaxial test. In an alternative embodiment of the disclosure, the adapter plate and the silhouette are integral with the head portion of the spindle.

A transducer is aligned coaxial with axis A, and is disposed about and coupled to the carriage. More specifically, the transducer is disposed about and surrounds the first end of the carriage and couples to the lip such that a portion of the transducer is disposed between the head portion of the spindle and the lip. Sensors of the transducer cooperate with the spindle to sense forces that may act on the spindle.

A mounting plate of the spindle carriage assembly is aligned coaxial with axis A and is disposed about and surrounds a portion of the shaft portion of the spindle. Moreover, the mounting plate couples to the transducer. The mounting plate couples the spindle carriage assembly to a housing such that a portion of the carriage and the shaft portion of the spindle are disposed in an interior of the housing. Important to the present embodiment of the disclosure, the carriage is disposed in the interior of the housing such that it does not touch, or is spaced from, the housing to allow it to "float" in the interior of the housing. By "floating" in the interior, forces that act on the housing are directly transferred to the spindle through the transducer, which allows for the transducer to measure the actual, i.e., summed, forces acting on the wheel assembly.

The housing of the present disclosure is illustrative or representative of a portion of the tailstock assembly of the prior art biaxial wheel test assemblies discussed above in the Background section. The spindle carriage assembly is designed for easy retrofitting into prior art biaxial wheel test assemblies to provide an improvement to the same. However, the spindle carriage assembly is not limited to use with the prior art biaxial wheel testing assemblies.

With the spindle carriage assembly retrofitted to a prior art biaxial wheel test assembly, the transducer and the sensors are each electrically connected to one another and the processor of the biaxial wheel test assembly. To initiate a biaxial test, a wheel assembly is received and supported by the silhouette. The motor of the biaxial wheel test assembly initiates rotation of the drum, and the actuators of the tailstock assembly position the wheel assembly in the cavity of the drum to cause contact between the wheel and the inner surface of the drum, which causes forces to act on the wheel assembly. During such contact, the wheel assembly freely rotates with the spindle, and the forces acting on the wheel-and-tire assembly are transferred to the spindle. The forces transferred to the spindle by the contact, and from the housing, are then sensed by the sensors of the transducer. Such spindle carriage assembly, results in less error and greater efficiency in calculating those forces acting on the wheel assembly during a biaxial test by removing the need for the rotating transducer, slip ring, position sensors, and transducers in associate with each actuator. Further, a biaxial test can be conducted in less time.

DETAILED DESCRIPTION OF THE DRAWINGS

DETAILED DESCRIPTION

Figure 1:
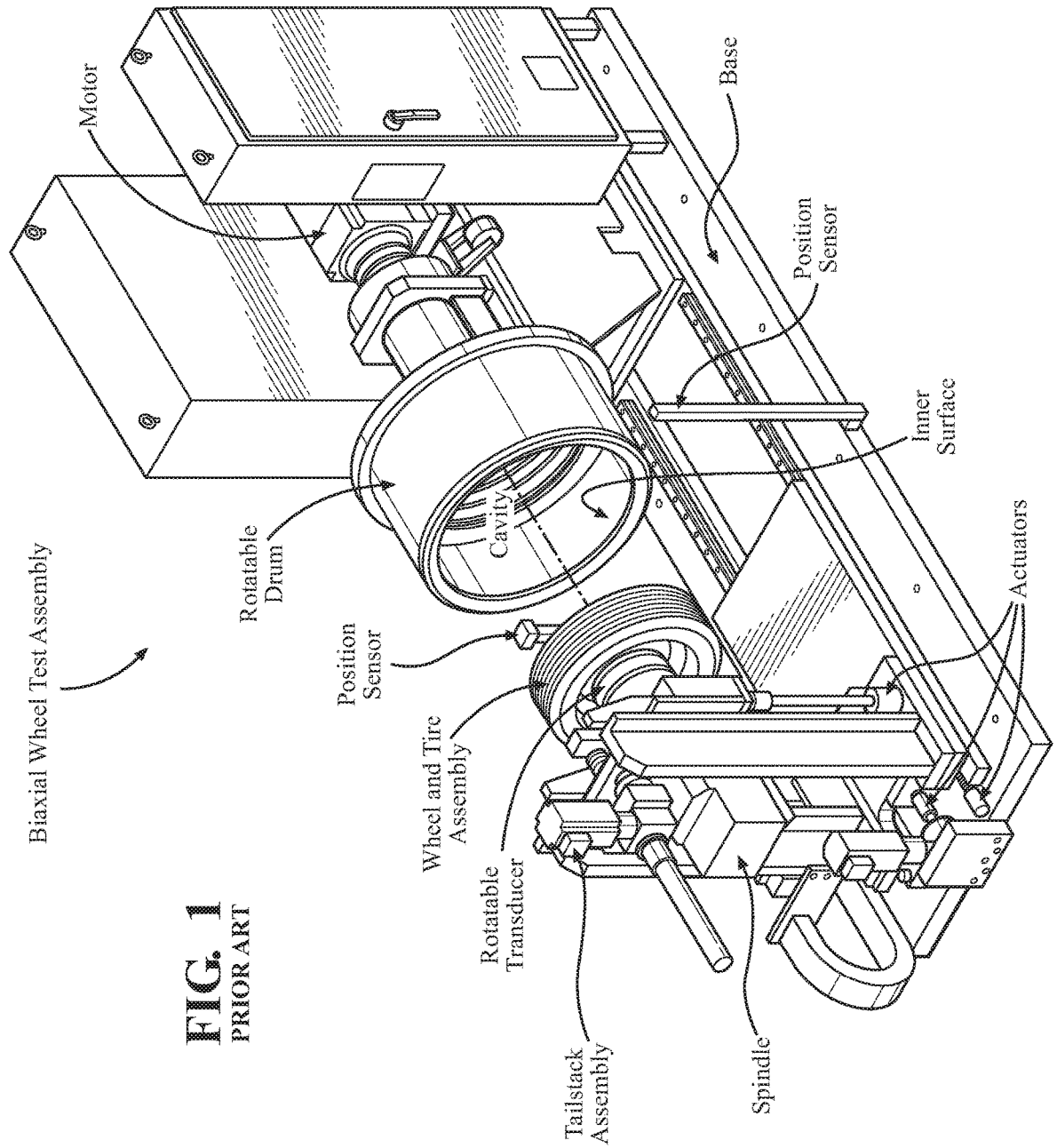
FIG. 1 illustrates a perspective view of the exemplary prior art wheel test assembly.
Figure 2:
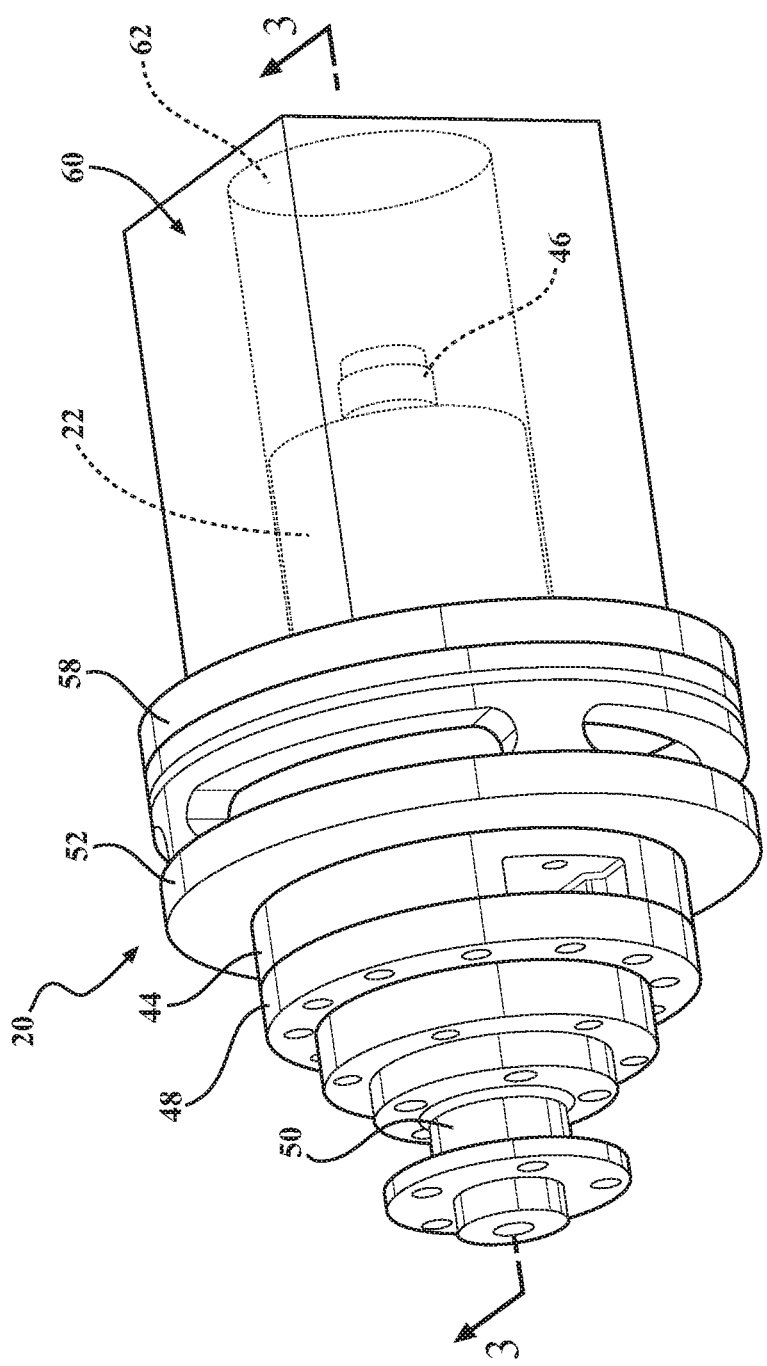
FIG. 2 illustrates a perspective view of the spindle carriage assembly, with the bore shown in phantom.
Figure 3:
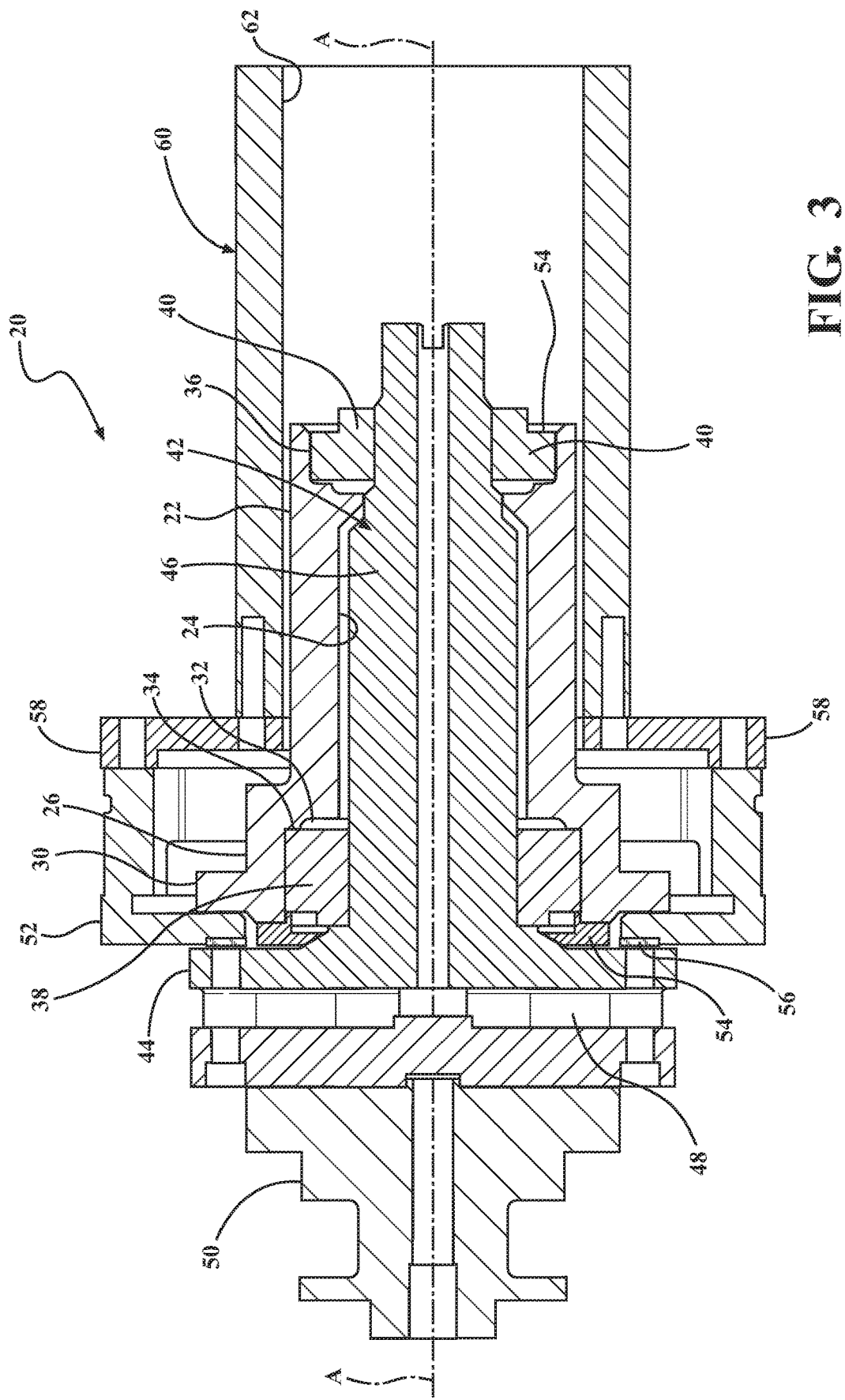
FIG. 3 illustrate a side sectional view of the carriage assembly taken along line 3-3 of FIG. 2; and, FIG. 4 illustrates an exploded view of the carriage assembly.
Figure 4:
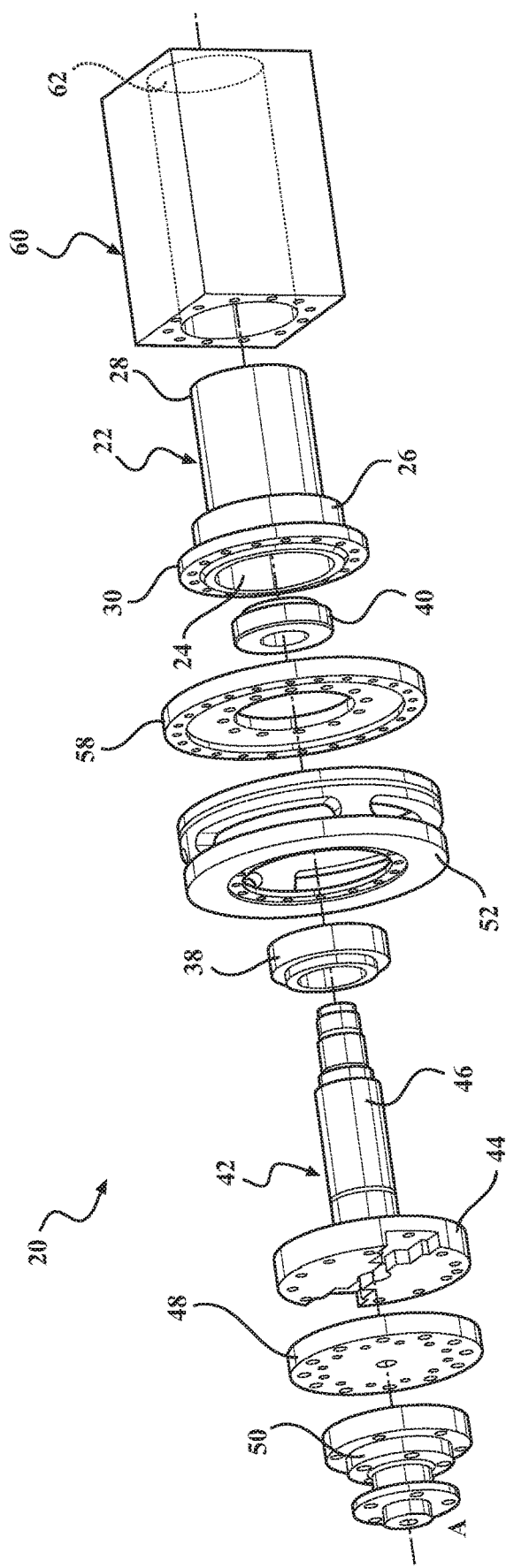

With references to FIGS. 2-4, the present disclosure provides a spindle carriage assembly 20 for use in a biaxial or tri-axial test on an object, such as a wheel assembly. Moreover, the spindle carriage assembly 20 is used to measure measure forces, moments, and/or torques about a spinning axis (herein collectively referred to as "forces and moments" and/or "forces") acting on the wheel assembly. With reference to FIGS. 3 and 4, the spindle carriage assembly 20 comprises a carriage 22 that has a cylindrical shape and is aligned coaxially with an axis A. The carriage 22 defines a first cavity 24, and has a first end 26 and a second end 28 opposite the first end 26. A lip 30 extends radial from the carriage 22 at the first end 26. An interior surface 32 of the carriage 22 defines first and second notches 34, 36 at the first and second ends 26, 28, respectfully. A first bearing 38 is disposed in, and coupled to, the first notch 34, and a second bearing 40 is disposed in, and coupled to the second notch 36.

The spindle carriage assembly 20 further comprises a spindle 42 that extends along and is coaxially aligned with axis A, and is rotatably coupled to the carriage 22. More specifically, the spindle 42 has a head portion 44, and a shaft portion 46 that extends from the head portion 44 where the shaft portion 46 is disposed in the cavity 24 of, and telescoped with, the carriage 22, and the head portion 44 is spaced from the lip 30 of the carriage 22. Further, the shaft portion 46 is coupled to the first and second bearings 38, 40, where the bearings 38, 40 support and allow for the spindle 42 to rotate about the axis A. Further, seals 54 are disposed between the head 44 portion of the spindle and the lip 30 of the carriage 22 and between the shaft portion 46 and the second end of the carriage 22. Generally, the spindle 42 connects to the wheel assembly. More specifically, however, an end of the spindle 42 may connect to the wheel assembly to support the wheel assembly during a biaxial test. In another embodiment, the head portion 44 of the spindle 42 may connect to the wheel assembly to support the wheel assembly during a biaxial test.

An adapter plate 48 of the spindle carriage assembly 20 is coaxially aligned with axis A, and is coupled to the head portion 44 of the spindle 42. However, the adapter plate 48 may be integral with the spindle 42. Additionally, a silhouette 50 is coaxially aligned with the axis A, and couples to the adapter plate 48. In the illustrated embodiment of FIGS. 2-4, the adapter plate 48 is coupled to the head portion 44 with fasteners such as bolts. However, the silhouette 50 may be couple directly to the head portion 44. Further, the silhouette 50 may be integral with the adapter plate 48 and/or the head portion 44. The silhouette 50 is illustrated in the FIGS. with a contour complementary to a contour of a wheel assembly. More specifically, the contour of the silhouette 50 is shaped to connect to the wheel assembly and to receive and support the wheel assembly during a biaxial test. One of skill in the art, however, will readily appreciate that the contour of the silhouette 50 could be of any shape for receiving, coupling, and/or supporting an object to which a biaxial test is to be performed on. Further, the adapter plate 48 may be designed to couple between various embodiments of the housing 60 and silhouette 50.

The spindle carriage assembly 20 further comprises a transducer 52 aligned coaxial with axis A and disposed about and coupled to the carriage 22. More specifically, the transducer 52 is disposed about and surrounds the first end 24 of the carriage 22 and couples to the lip 30 such that a portion of the transducer 52 is disposed between the head portion 44 of the spindle 42 and the lip 30. In the embodiment illustrated in the FIGS., the transducer 52 is coupled to the lip 30 of the carriage 22 by bolts, or other fasteners. The transducer 52 of the present disclosure is an off-the-shelf transducer, such as those wheel force transducers sold by Michigan Scientific. One of skill in the art, however, will appreciate the many alternative transducers 52 that may be used. It is also anticipated that other means for measuring forces may be used in place of the transducer 52. Further, sensors 56 of the transducer cooperate with the spindle 42 to sense forces and/or moments that may act on the spindle. In the present embodiment of the disclosure, the sensors 56 are strain gauges, which sense forces that may act on the spindle 42. One of skill in the art will appreciate that any sensor for measuring forces may be used for the sensors 56. For example, a piezoelectric sensor could be used.

A mounting plate 58 of the spindle carriage assembly 20 is aligned coaxial with axis A and is disposed about and surrounds a portion of the shaft portion 46 of the spindle 42. Moreover, the mounting plate 58 couples to the transducer 52. Moreover, and when coupled to the transducer 52, the mounting plate 58 couples the spindle carriage assembly to a housing 60 such that a portion of the carriage 22 and the shaft portion 46 of the spindle are disposed in an interior 62 of the housing 60. The mounting plate 58 couples to the transducer 52 and the housing 60 by bolts. However, any alternative means may be used to couple the mounting plate 50 to the transducer and/or housing 60. For example, the mounting plate 50 and/or transducer may be integral with the housing 60. Important to the present embodiment of the disclosure, and as best illustrated in FIGS. 2-4, the carriage 22 is disposed in the interior 62 of the housing 60 such that it does not touch, or is spaced from, the housing 60 allowing it to "float" in the interior 62 of the housing 60. By "floating" in the interior 62, forces that may act on the housing 60 are transferred directly to the spindle 42.

The housing 20 of the present disclosure is illustrative or representative of a portion of the tailstock assembly of the prior art biaxial wheel test assemblies discussed in the Background section. The spindle carriage assembly 20 is designed to be retrofitted into a prior art biaxial wheel test assembly to provide an improvement to the same. More specifically, and as will be elaborated further below, when integrated into the tailstock assembly of a prior art wheel test assembly, the rotating transducer, slip ring, position sensors, and multiple transducers associated with each actuator are not needed, and can be removed.

Although the following discusses the use of the spindle carriage assembly 20 when retrofitted to a prior art wheel test assembly, it is to be appreciated that the spindle carriage assembly 20 may be designed for use in many different industries to facilitate a biaxial or tri-axial test on an object. For example, it is contemplated that the spindle carriage assembly 20 may be used in the aerospace industry for conducting test on jet engines or propellers of a helicopter. Further, the spindle carriage assembly 20 could be used for testing, or use in, propellers of ships and boats, turbines, or wind mills. Moreover, the spindle carriage assembly 20 could be retrofitted to an axial of an automobile to measure forces as the automobile travels. Lastly, the spindle carriage assembly 20 may be retrofitted to a tri-axial test assembly. As one of skill in the art will appreciated, there are many various industries, and applications, for which the spindle carriage assembly could be utilized for conducting a biaxial test or measuring forces.

With the spindle carriage assembly 20 retrofitted to a prior art biaxial wheel test assembly, the transducer 52 and the sensors 56 are each electrically connected to one another and a processor of the biaxial wheel test assembly. To initiate a biaxial test, a wheel assembly is received and supported by the silhouette 50. A motor of the biaxial wheel test assembly initiates rotation of the drum, and the actuators of the tailstock assembly positions the wheel assembly in the cavity of the drum to cause contact between the wheel and the inner surface of the drum, which causes forces to act on the wheel assembly. During such contact, the wheel assembly freely rotates with the spindle 42, and the forces acting on the wheel assembly are transferred to the spindle 42. The forces transferred to the spindle 42 are then sensed by the sensors 56 of the transducer 52.

The spindle 42 being supported by, and freely rotatable, within the carriage 22 allows for the direct transfer of forces from the wheel assembly to the spindle 42. Further yet, since the carriage 22 is "floating" in the interior 62 of the housing 60, forces that act on the housing 60 to move the wheel assembly during the biaxial test are directly transferred to the spindle 42 through the transducer 52. Therefore, the forces acting on the spindle 42, and sensed by the sensors 56 of the transducer 52 are equivalent to all, or the sum of all, forces acting on the wheel assembly. Therefore, the spindle carriage assembly 20 results in less error and greater efficiency in calculating forces acting on the wheel assembly during a biaxial test by removing the need for the rotating transducer, slip ring, position sensors, and transducers in associate with each actuator.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Upon review of the disclosure, many other embodiments may be apparent to those skilled in the art. Moreover, other embodiments may be used and derived from the disclosure, such that a structural substitution, logical substitution, or another change may be made without departing from the scope of the disclosure. Accordingly, the disclosure is to be regarded as illustrative rather than restrictive.

Certain features, for clarity, described herein in the context of separate embodiments, may also be provided in combination in a single embodiment. Conversely, various features that are, for brevity, described in the context of a single embodiment, may also be provided separately or in any subcombination. Further, references to values are to be regarded as non-limiting examples.

What is claimed is:

1. An assembly for measuring forces acting on an object, the assembly comprising:
   a housing that defines an interior, and the housing is coaxially aligned with an axis;
   a spindle carriage assembly comprising:
     a carriage disposed in the interior and coaxially aligned with the axis, and the carriage defines a first cavity;
     a spindle coaxial aligned with the axis, and partially telescoped in the cavity and rotatably coupled to the carriage, and the spindle connects to and supports the object;
     a transducer coaxially aligned with the axis and disposed about and coupled to the carriage adjacent the end of the spindle, and the transducer cooperates with the spindle to sense and measures forces acting on the spindle;
   the spindle carriage assembly is coupled to the housing with the carriage disposed in the interior of the housing and spaced from the housing, wherein forces acting on the object and the housing are transferred to the spindle and measured by the transducer.

2. The assembly of claim 1 wherein the spindle has a shaft portion that is partially telescoped with the cavity and ratably couples the spindle to the cavity.

3. The assembly of claim 1 wherein the spindle has a head portion disposed at the end and adjacent the carriage to receive and support the object.

4. The assembly of claim 1 further comprising a bearing disposed in the first cavity and coupled to the carriage and the spindle to allow rotation of the spindle about the axis.

5. The assembly of claim 4 wherein the carriage has an interior surface that defines a notch, and the bearing is disposed in the notch.

6. The assembly of claim 1 wherein a mounting plate is aligned coaxial with the axis and disposed about a portion of the spindle, and the mounting plate couples to the transducer and the housing to couple the spindle carriage assembly to the housing.

7. The assembly of claim 1 wherein an adapter plate is coaxially aligned with the axis and couples to the end of the spindle.

8. The assembly of claim 7 wherein fasteners couple the adapter plate to the end of the spindle.

9. The assembly of claim 1 wherein an adapter plate is coaxially aligned with the axis and integral with the spindle.

10. The assembly of claim 9 wherein a silhouette is coaxially aligned with the axis and integral with the adapter plate to connect the spindle to the object, and to receive and support the object.

11. The assembly of claim 1 wherein a silhouette is coaxially aligned with the axis and couples to the spindle to connect the spindle to the object to receive and support the object.

12. The assembly of claim 11 wherein fasteners couple the silhouette to the spindle.

13. The assembly of claim 1 wherein a silhouette is coaxially aligned with the axis and integral with the spindle to connect the spindle to the object, and to receive and support the object.

14. The assembly of claim 1 wherein the transducer has at least two sensors that cooperate with the spindle to sense and measure at least one of forces and moments acting on the spindle.

15. The assembly of claim 14 wherein the sensors are strain gauges.

16. The assembly of claim 14 wherein the transducer has four sensors.

17. An assembly for measuring forces acting on an object, the assembly comprising:
   a housing that defines an interior, and the housing is coaxially aligned with an axis;
   a spindle carriage assembly comprising:
     a carriage disposed in the interior and coaxially aligned with the axis, and the carriage defines a first cavity, and an interior surface of the carriage defines a notch;
     a bearing disposed in the notch and coupled to the carriage;
     a spindle coaxial aligned with the axis and partially disposed in a telescoped relationship with the carriage and rotatably coupled to the carriage to allow rotation of the spindle about the axis, and the spindle connects to and supports the object;
     a transducer coaxially aligned with the axis and disposed about and coupled to the carriage adjacent the head portion of the spindle, and the transducer copperates with the spindle to sense and measures forces acting on the spindle;
   the spindle carriage assembly is coupled to the housing with the carriage disposed in the interior of the housing and spaced from the housing, wherein forces acting on the object and the housing are transferred to the spindle and measured by the transducer.

18. The assembly of claim 17 wherein a mounting plate is aligned coaxial with the axis and is disposed about a portion of the spindle, and the mounting plate couples to the transducer and the housing to couple the spindle carriage assembly to the housing.

19. The assembly of claim 17 wherein an adapter plate is coaxially aligned with the axis and is integral with the spindle.

20. The assembly of claim 19 wherein a silhouette is coaxially aligned with the axis and couples to the adapter plate to connect the spindle to the object, and to receive and support the object.

* * * * *